(12) United States Patent
Lempiäinen

(10) Patent No.: US 6,510,312 B1
(45) Date of Patent: Jan. 21, 2003

(54) METHOD FOR OPTIMISING COVERAGE BY RESHAPING ANTENNA PATTERN

(75) Inventor: Jukka Lempiäinen, Helsinki (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/194,575

(22) PCT Filed: May 26, 1997

(86) PCT No.: PCT/FI97/00317

§ 371 (c)(1),
(2), (4) Date: Apr. 8, 1999

(87) PCT Pub. No.: WO97/46039

PCT Pub. Date: Dec. 4, 1997

(30) Foreign Application Priority Data

May 27, 1996 (FI) .................................................. 962217

(51) Int. Cl.⁷ ................................................. H04B 7/02
(52) U.S. Cl. ........................ 455/101; 455/129; 455/562; 342/368
(58) Field of Search .............................. 370/337, 328; 455/101, 129, 562; 342/368; 343/757

(56) References Cited

U.S. PATENT DOCUMENTS

| 4,249,181 | A | * | 2/1981 | Lee | 342/367 |
|---|---|---|---|---|---|
| 5,013,979 | A | * | 5/1991 | Birleson | 342/375 |
| 5,053,786 | A | * | 10/1991 | Silverman et al. | 343/895 |
| 5,512,914 | A | * | 4/1996 | Hadzoglou et al. | 343/816 |
| 5,596,329 | A | * | 1/1997 | Searle et al. | 342/374 |
| 5,924,020 | A | * | 7/1999 | Forssen et al. | 455/129 |
| 5,991,345 | A | * | 11/1999 | Ramasastry | 375/347 |

FOREIGN PATENT DOCUMENTS

| GB | 2 281 012 A | 2/1995 |
|---|---|---|
| GB | 2 307 142 A | 5/1997 |
| JP | 4-320122 | 11/1992 |
| WO | WO 95/34102 | 12/1995 |
| WO | WO 97/23017 | 6/1997 |

* cited by examiner

Primary Examiner—Edward F. Urban
Assistant Examiner—Erika A Gary
(74) Attorney, Agent, or Firm—Pillsbury Winthrop LLP

(57) ABSTRACT

The invention relates to a method of optimizing coverage by changing the antenna pattern (14). In a solution of the invention, the base station (10) orients the antenna lobe (14) in the vertical direction toward a terminal equipment (11–13) by changing the shape of the antenna lobe according to a timing advance. The nearer the terminal equipment (11–13) is to the base station (10), the more downward the antenna lobe (14) is oriented by turning the antenna lobe (14) primarily downward or by changing the shape of the antenna pattern (14). In this way, transmission power, and thereby interference, is reduced.

8 Claims, 3 Drawing Sheets

US 6,510,312 B1

METHOD FOR OPTIMISING COVERAGE BY RESHAPING ANTENNA PATTERN

This application is the national phase of international application PCT/FI97/00317 filed May 26, 1997 which designated the U.S.

FIELD OF INVENTION

The invention relates to a method for optimising coverage, useful in a TDMA-based radio system which comprises several terminal equipments and base stations, and in which a signal is sent in time slots, a propagation delay of the signal between the terminal equipment and the base station is defined, and the antenna lobe of the base station is oriented.

BACKGROUND OF INVENTION

An example of a typical time divisional radio system is the GSM (Global System for Mobile communication). Multiple access is implemented by providing several carrier waves, each carrier wave having at most eight simultaneous users. In order that the signals of these eight users could be separated from one another, they are sent as bursts in predefined time slots. In other words, a transmitter transmits only at a predefined time instant. A frame comprises the time slots of eight users, and repetition of the frame allows transmission of even a large quantity of data.

In prior art solutions, the coverage of a multiple access cellular radio system based on time division is optimised by adjusting the transmission power and/or orienting the antenna lobe in the horizontal direction. The adjustment of the transmission power, however, is not always possible. In particular, when the receiver is located far or behind an obstacle, the transmitter has to use a high transmission power. The problem with horizontal orientation of the antenna lobe is that the base station has to know in what direction or location the terminal equipment is. This piece of information is not always available. Typically the base station knows only the propagation delay of the signal between the base station and the terminal equipment.

BRIEF DESCRIPTION OF INVENTION

The object of the present invention is to optimise the coverage area of a base station in a situation where the base station does not know the location or direction of a terminal equipment. If, on the other hand, the base station knows the location or direction of the terminal equipment, the coverage area and the shape of the lobe can be further optimised more effectively than in the prior art.

The object is achieved by a method as described in the introduction, the method being characterized in that the antenna lobe of the base station assigned to the terminal equipment is oriented subscriber-terminal-specifically by changing the shape of the antenna lobe at least in the vertical direction.

Major advantages are achieved by the method of the invention. The orientation of the antenna lobe of the base station reduces the amount of transmission carried outside the cell, and so intercellular interference is also reduced. When the antenna lobe is oriented toward a terminal equipment, the transmission power of the terminal equipment can also be minimised, which reduces the overall interference level both within a cell and in adjacent cells.

BRIEF DESCRIPTION OF FIGURES

In the following the invention will be described in greater detail with reference to the examples illustrated in the attached drawings, in which.

DESCRIPTION OF PREFERRED EMBODIMENTS

The solution provided by the invention can be used in digital and analogue radio systems based on time division. The invention is here described mainly with reference to the GSM cellular radio system operated by a digital TDMA method. The applicability of the invention, however, is not limited to the GSM system.

Figure 1:
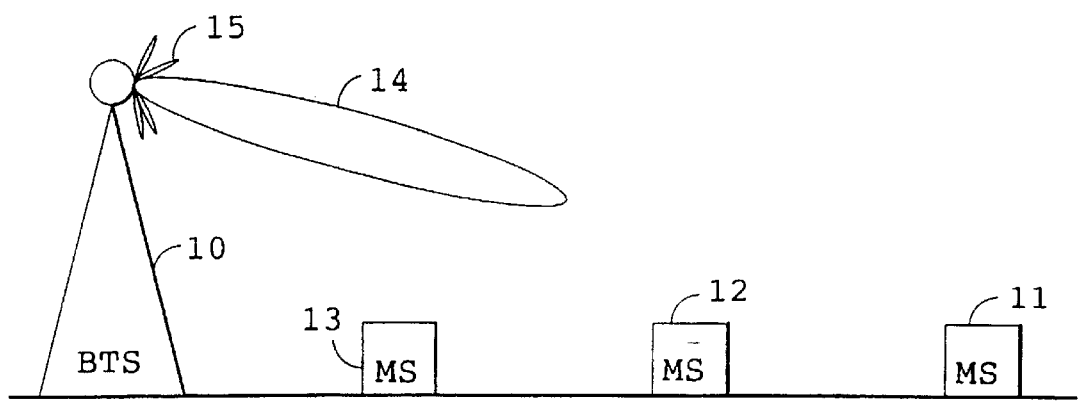
FIG. 1 illustrates orientation of the antenna patter of a base station.
Figure 2:
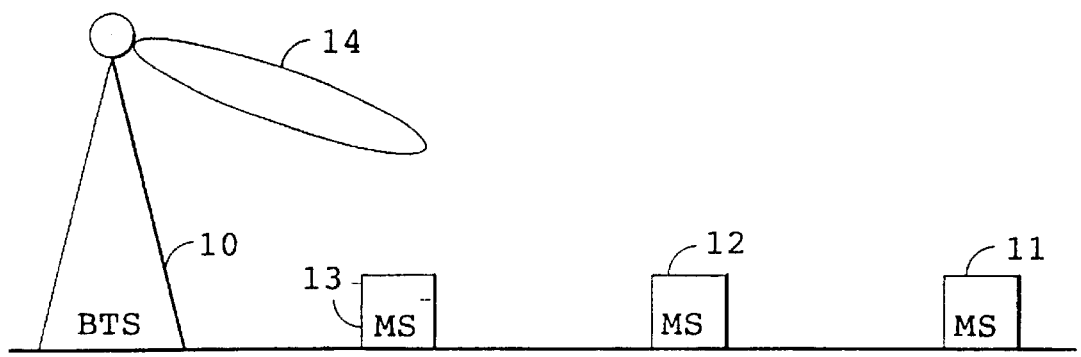
FIG. 2 illustrates orientation of the antenna pattern of a base station.
Figure 3:
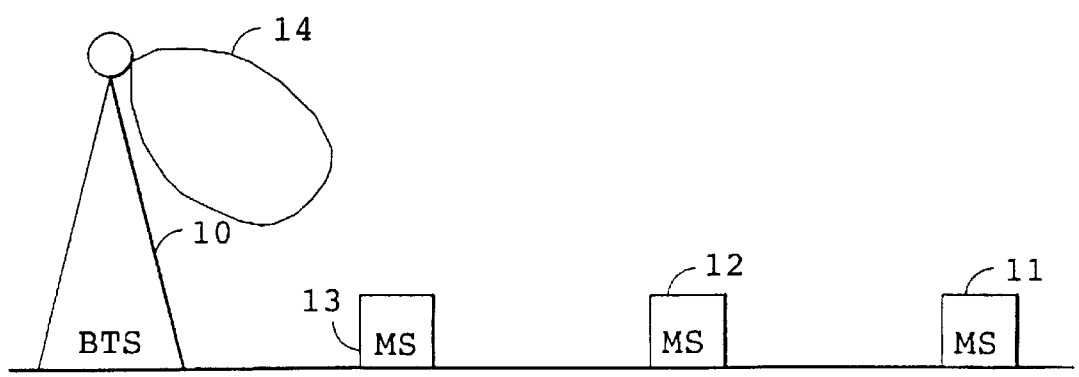
FIG. 3 illustrates orientation of the antenna pattern of a base station.

FIGS. 1 to 3 illustrate an inventive way of orienting an antenna, pattern in a cell of a cellular radio system. FIGS. 1 to 3 show a base station 10 and terminal equipments 11–13. The base station 10 has an antenna lobe 14 that can be oriented. In addition to the major lobe, the antenna lobe 14 comprises minor lobes 15, which are irrelevant to the invention. Hereinafter, the direction of the antenna lobe means the primary direction of the major lobe.

In FIG. 1 the base station 10 communicates with terminal equipment 11, which is preferably a mobile station. The antenna lobe of the base station 10 is oriented toward terminal equipment 11, which is here assumed to be located near the edge of the actual coverage area of the cell, i.e. base station 10. The propagation delay of the signal between the terminal equipment 11 and the base station 10 is then typically at its longest.

In FIG. 2 the base station 10 communicates with terminal equipment 12, which is closer to the base station 10 than terminal equipment 11. The propagation delay of the signal between the base station 10 and terminal equipment 12 is typically shorter than in the case of FIG. 1. The antenna lobe 14 of the base station 10 is here tilted essentially vertically downward toward terminal equipment 12. The advantage achieved is that the transmission from the base station 10 is oriented primarily to terminal equipment 12, and simultaneously, to a lesser degree than in the prior art, to adjacent cells, in which the transmission from the base station 10 causes interference. In addition, the transmission power of the base station 10 can be held lower than in the prior art, since the transmission from the base station 10 is oriented particularly to terminal equipment 12. The transmission power of terminal equipment 12 can also be held lower than in the prior art, since the antenna lobe 14 of the base station 10 is also oriented toward terminal equipment 12 during the listening mode.

FIG. 3 shows another embodiment of the invention. The antenna lobe 14 of the base station 10 can also be oriented by changing the shape of the lobe. This can be done, for example, simply by reducing or enlarging the width of the antenna lobe 14 in the vertical direction. The embodiment can be applied together with or separately from the preceding embodiment. When terminal equipment 13 is close to the base station 10, the antenna lobe 14 of the base station 10 can be widened in the vertical direction, whereby the antenna lobe, i.e. major lobe 14, also extends to terminal equipments 13 nearby. The antenna lobe 14 radiates far at a low power, whereby little interference occurs in adjacent cells. When the base station 10 transmits to or listens to a distant station, the antenna lobe 14 is narrowed. The situation is then the same as in FIG. 1, where the narrow antenna lobe 14 is oriented toward terminal equipment 11.

Figure 4:
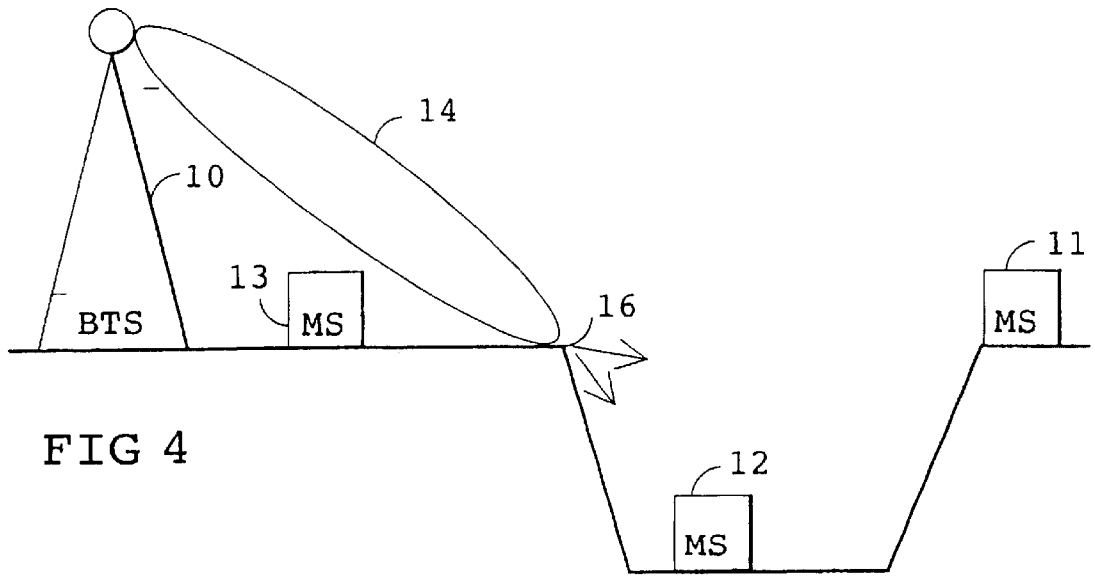
FIG. 4 illustrates orientation of the antenna pattern of a base station to a diffraction point.

FIG. 4 shows an otherwise similar situation as FIG. 2 except that terminal equipment 12 is located in a valley or behind an obstacle so that there is no direct line of sight from the antenna lobe 14 of the base station 10 to terminal equipment 12. The antenna lobe 14 is then oriented to a diffraction point 16. An edge of the obstacle cuts some of the radiation, but the edge is simultaneously a diffraction point 16 and functions as a source of a new wavefront in accordance with the Huygens' principle, the electromagnetic radiation that carries the signal being diffracted therefrom to the reception antenna of terminal equipment 12. Since the electromagnetic radiation travels in both directions in the same way, a connection from terminal equipment 12 to the base station 10 is also made possible by the diffraction.

Figure 5:
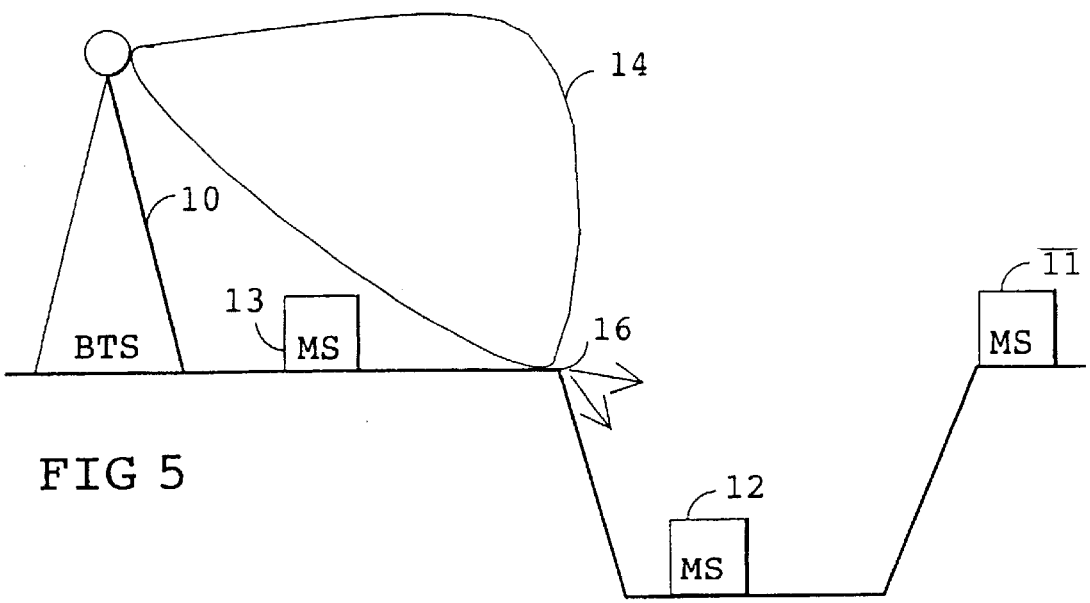
FIG. 5 illustrates orientation of the antenna pattern to a diffraction point.

FIG. 5 concerns shaping of the antenna lobe, i.e. antenna pattern 14. In a preferred embodiment of the invention, the antenna lobe can be shaped essentially as desired. In this example, the antenna lobe 14 is shaped so that the primary direction of the lobe 14 is toward the diffraction point 16, from which part of the signal scatters to terminal equipment 12. If, on the other hand, not enough scattering takes place, terminal equipment 12 may still hear the transmission as a reflection. As compared with FIGS. 1 to 4, the difference is that the antenna lobe 14 is asymmetrical to the primary direction (main axis) of the antenna lobe 14. Terminal equipments 11 and 13 do thus not hear, or hear badly, a signal destined to terminal equipment 12.

Figure 6:
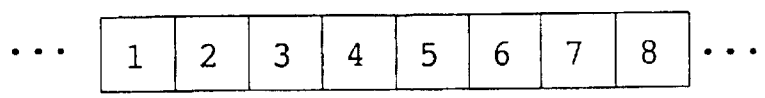
FIG. 6 illustrates a GSM frame.

FIG. 6 shows a TDMA frame of the GSM system. The frame comprises eight time slots 1 to 8, which stand for the instants when a certain terminal equipment or base station can transmit or receive signals. The signals of the time slots in the frame use the same carrier wave, and the signals are separated from one another by time division. In one time slot is usually sent one burst that contains data, e.g. a normal burst that comprises start and stop bits, data bits, and training sequence bits, 248 bits in all. A time slot can take up to 256.25 bits, including the protective periods, and the duration of a time slot is 3.692 $\mu$s, from which it follows that the duration of a frame is 576.92 $\mu$s.

In a preferred embodiment of the invention, the antenna lobe 14 of the base station 10 is re-oriented in every time slot, preferably separately to each user, i.e. terminal equipment 11–13. Naturally, orientation is most preferably performed by turning the antenna lobe toward a terminal equipment 11–13 or a diffraction point 16.

Figure 7:
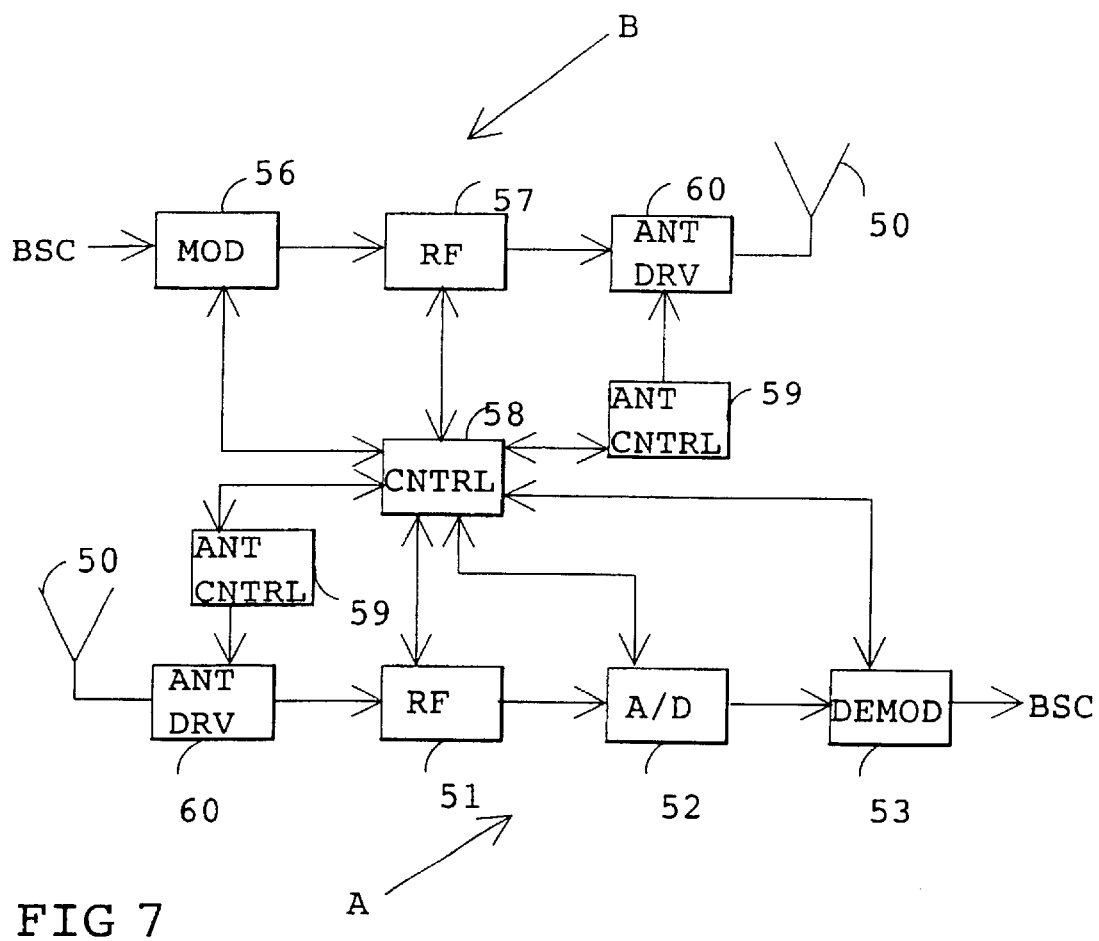
FIG. 7 illustrates a structure of a base station.

FIG. 7 is a block diagram of the essential parts of a typical structure of a base station 10. On the reception side A, the base station 10 comprises an antenna 50, radio frequency means 51, an analogue/digital converter 52, and a demodulator 53, from which the signal propagates, where necessary, to a base station controller or the like (not shown in the figure). On the transmission side B, the base station 10 comprises a modulator 56 receiving data from the base station controller, radio frequency means 57, and an antenna 50. The operation of the antenna 50 is preferably controlled in an inventive manner by an antenna controller 60 on the basis of a control signal obtained from control means. The antenna controller 60, in turn, is controlled by antenna control means 59, which belong to control means 58 controlling the operation of essentially all transmitter and receiver blocks. The radio frequency means 51 lower the radio frequency signal to an intermediate frequency, after which the A/D converter 52 converts the signal to digital form. The digital signal is, for example, demodulated in the demodulator 53. Correspondingly, the signal is, for example, modulated in the modulator 56, after which the digital signal is converted to a radio frequency signal by the radio frequency means 57. The radio frequency signal is output from the antenna 50. The base station processes the digital signal preferably by digital signal processing means, which are typically microprocessor-based ASIC or VLSI circuits.

When signals are transmitted in the solution of the invention, the propagation delay of the signal from the transmitter to the receiver is preferably taken into account. Since the instant of reception must be the same irrespective of the distance between the transmitter and the receiver, a signal is transmitted earlier to a distant receiver than to a receiver nearby. Consequently, a time slot destined to a distant receiver is transmitted with a suitable timing advance. The suitable timing advance is defined as described in the prior art. In the solution of the invention, the direction of the antenna lobe is changed as a function of timing advance preferably so that the shorter the timing advance, the more the antenna lobe is tilted downward. The downward tilt can be achieved by changing the primary direction of the lobe, or by using a larger vertical width, or by otherwise shaping the lobe so that the signal best reaches the terminal equipment. If there is no direct line of sight from the base station to the terminal equipment, the primary direction of the lobe is preferably toward a diffraction point, at which the signal is diffracted to a terminal equipment. The propagation delay of the signal from the transmitter to the receiver is defined by control means 58, which also define the timing advance needed for the signal transmitted.

Figure 8:
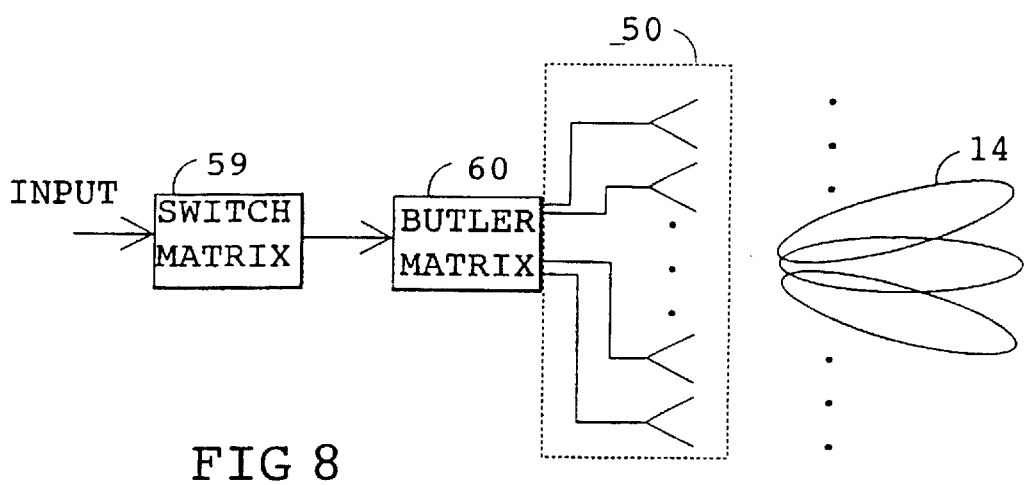
FIG. 8 illustrates a Butler type antenna structure.

In the solution provided by the invention, the transmitter and the receiver may have a common antenna or separate antennas 50. The antenna 50 is typically a group of antennas, which allows phasing of the antennas and thereby turning and/or shaping of the antenna lobe. One possible antenna group solution is a Butler type antenna of FIG. 8, which may be linear, planar (two-dimensional), or omnidirectional. In this antenna solution, the Butler matrix, which corresponds to the antenna controller 60 of FIG. 7, phases the signal obtained from the antenna elements. Control means 58 thus define the distance of the terminal equipment 11–13 (propagation delay of the signal), and antenna control means 59 define the phasing and amplitude of the antennas on the basis of the information obtained from control means 58. The antenna controller 60 controls the antenna 50 on the basis of a control signal obtained from antenna control means 59. The number of outputs of the antenna control means, i.e. in this case switch matrix 59, is the same as the number of virtual antenna lobes 14. The number of antenna lobes need not be the same, however, as the number of antennas 50. The phasing of a Butler type antenna group 50 is typically fixed, whereby a lobe 14 with a desired direction or shape can be selected from a fixed number of antenna lobes. Another potential antenna group solution is an adaptive antenna, in which the antenna pattern is not fixed but can be changed and shaped according to the need.

The preferably vertical changing of the antenna lobe according to the invention can be combined with horizontal changing of the antenna lobe, whereby the antenna lobe can be oriented even more accurately to a terminal equipment, and interference both within and outside the cell can be reduced. The inventive method improves coverage both in rural conditions and, in particular, in urban conditions.

Although the invention is described above with reference to the example illustrated in the attached drawings, it is to be understood that the invention is not limited thereto but can be varied in many ways within the scope of the inventive idea presented in the attached claims.

What is claimed is:

1. A method for optimizing coverage, useful in a TDMA-based radio system which includes several terminal equipments and base stations, and in which a signal is sent in time slots, a signal propagation delay between the terminal equipment and the base station being defined, the method comprising:

orienting an antenna lobe of the base station assigned to the terminal equipment subscriber-terminal specifically by changing a shape of the antenna lobe at least in a vertical direction; and when there is no direct line of sight between the terminal equipment and the base station because of an obstacle, orienting the antenna lobe to an edge of the obstacle between the terminal equipment and the base station so that part of the lobe is diffracted to a terminal equipment.

2. The method of claim 1, wherein the antenna lobe is oriented toward the terminal equipment.

3. The method of claim 1, wherein the antenna lobe is oriented subscriber-terminal specifically according to the signal propagation delay between the terminal equipment and the base station.

4. The method of claim 1, wherein the antenna lobe of the base station is re-oriented in every time slot.

5. The method of claim 1, wherein the shorter the propagation delay of the signal to the terminal equipment, the more downward the antenna lobe of the base station is oriented.

6. The method of claim 1, wherein when an antenna group is used as an antenna at the base station, the antenna lobe of the base station is oriented by changing the mutual phasing of the antennas in the antenna group.

7. The method of claim 1, wherein when a timing advance is defined for a time slot based on the propagation delay of the signal between the terminal equipment and the base station, the shorter the timing advance, the more downward the antenna lobe is oriented as a function of timing advance.

8. The method of claim 1, wherein the antenna of the base station is an essentially horizontally omnidirectional antenna, which can be oriented at least in the vertical direction.

* * * * *